I. M. ROSE.

Embroidering-Attachment for Sewing-Machines.

No. 6,473. Reissued June 1, 1875.

Witnesses:
John Becker.
Fred. Haynes

Inventor.
Israel M. Rose.
by his Attorneys
Brown & Allen.

UNITED STATES PATENT OFFICE.

ISRAEL M. ROSE, OF BROOKHAVEN, NEW YORK, ASSIGNOR, BY MESNE ASSIGNMENTS, TO JOSEPH J. WEST, OF NEW YORK CITY.

IMPROVEMENT IN EMBROIDERING ATTACHMENTS FOR SEWING-MACHINES.

Specification forming part of Letters Patent No. 136,098, dated February 18, 1873; reissue No. 6,473, dated June 1, 1875; application filed November 25, 1874.

*To all whom it may concern:*

Be it known that I, ISRAEL M. ROSE, of Brookhaven, in the county of Suffolk and State of New York, have invented certain Improvements in Embroidery Devices, of which the following is a full, clear, and exact description, reference being had to the accompanying drawing forming part of this specification.

This invention consists in a thread-enchaining device for the production of an enchained embroidery-thread, which is laid in the form of a braid upon the surface of the fabric to be embroidered, such enchained thread or braid not passing through the fabric, but being secured thereon by stitching it to the surface thereof. This thread-enchaining device is mainly composed of a vibrating needle, operating in combination with a presser-foot and feeding mechanism, said needle constituting an embroidery-thread carrier, which has a vibratory motion in line of the length of the braid or enchained stitch, and, as an attachment to a sewing-machine, may, for convenience sake, be operated by the needle-bar thereof, but the action of which is independent of that of the sewing-needle used to stitch or sew the enchained embroidery-stitch on the surface of the fabric. The invention also consists in various peculiarities of construction and combinations of parts as regards said thread-enchaining device and its proposed attachment to a sewing-machine.

Figure 1:
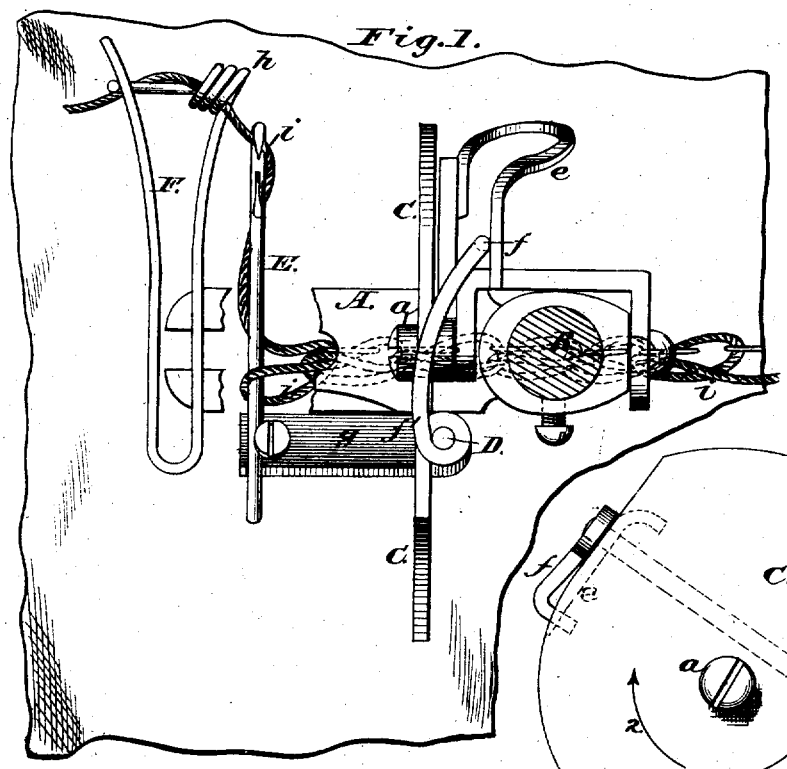
Figure 3:
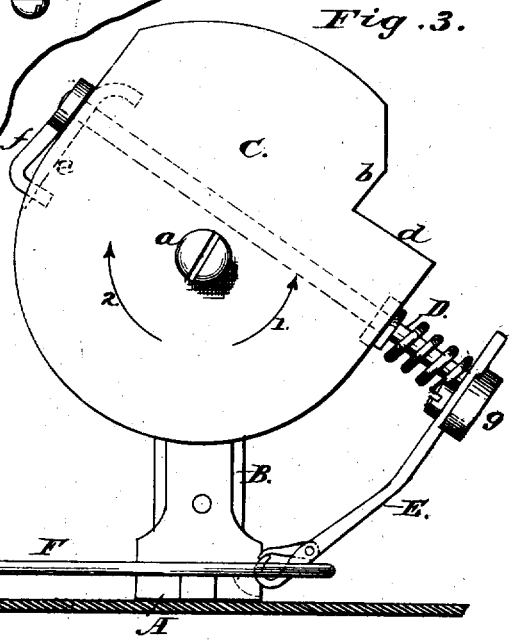
Figure 2:
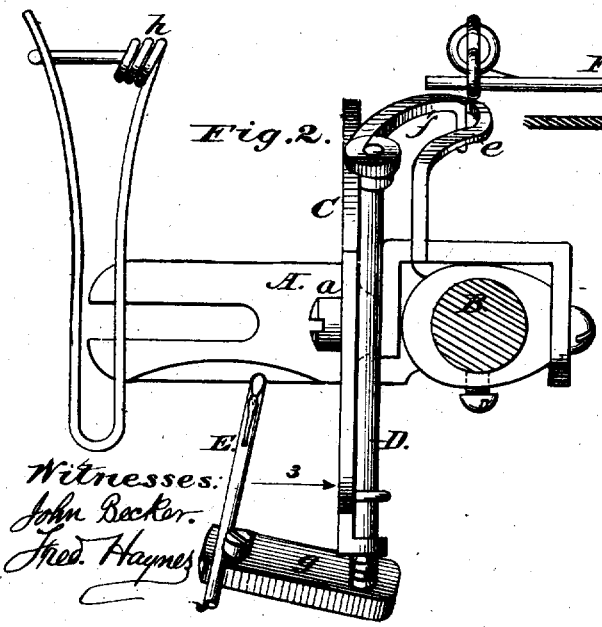

Figures 1 and 2 represent top views of my improved embroidery device as an attachment to a sewing-machine, and Fig. 3 a face view of the same.

A is the presser-foot of a sewing-machine, of suitable construction, and B the shank or holder of said foot, which may be adjustable, if desired, in the customary manner.

The sewing-machine to which my improved embroidery device is applied as an attachment may be of any suitable description, either arranged to work one thread only, or with a shuttle; and I do not confine myself in the use of my invention to the use of any particular kind of sewing-machine.

To the presser-foot shank at *a* is pivoted a plate or bar, C, which has two shoulders, *b d*. A projection on the needle-bar (not shown) is in line with these shoulders, and strikes the shoulder *b* during the ascent of the needle-bar, swinging the plate C in the direction of the arrow 1, Fig. 3, while during the descent of said needle-bar its said projection strikes the shoulder *d*, thereby turning the plate C on its pivot in the direction of the arrow 2, Fig. 3. This use of the needle-bar of the sewing-machine for operating the thread-enchaining device does away with any special device for the purpose. On the back, or, if desired, on the face, of the plate C is hung a swiveling-arbor, D, in such manner that it can swivel or swing independently on its own axis, its independent oscillations being controlled by a slotted guide, *e*, which projects backwardly from the shank of the presser-foot, and into which slot a crank, *f*, of the arbor D enters. The lower end of said arbor carries a projecting arm, *g*, to which a latch-needle, E, is rigidly secured by means of a set-screw or otherwise. This latch-needle, during the oscillations of the plates C, is carried into the two extreme positions in Figs. 1 and 2—that is to say, during the downward motion of the needle-bar, when the plate C is swung in direction of the arrow 2, the latch-needle is carried above and across the presser-foot into the position shown in Fig. 1, and during the subsequent upward motion of the needle-bar, when the plate C is swung in direction of the arrow 1, the latch-needle is carried clear of and beyond the presser-foot into the position shown in Figs. 2 and 3. Fastened to the end of the presser-foot is a wire guide, F, which is formed at *h* into a loop, through which the thread used to form the embroidery-braid or enchained thread is drawn, after having passed through or over suitable tension devices.

When the needle-bar descends and causes the latch-needle E to move toward the loop *h*, said latch-needle catches under and takes hold of the embroidery-thread, which is shown at *i* in Fig. 1; and during the subsequent ascent of the needle-bar the latch-needle, swinging away from the loop *h*, carries the embroidery-thread with it across and over the presser-foot; and at the end of its movement in this direction the latch-needle will be swung in direction of the arrow 3, Fig. 2, by the crank *f* moving in the loop *h* or stationary slot *e*, into which it is laterally deflected at the end of the upward vibration in direction of the arrow 1 of the plate C. This lateral movement of the latch-needle E causes the same to pass or stand behind the sewing-needle, so as to be out of the way thereof, and in this position that portion of the embroidery-thread which lies across the presser-foot is sewed down during the descent of and by the sewing-needle and its thread. The subsequent vibration of the plate C in direction of the arrow 2 causes its latch-needle to pass through the loop last formed of the enchained embroidery-thread, and to retain such loop on the shank of said needle, and to open the latch of the latter, so that said needle can again take hold of a new part of the embroidery-thread and draw it back over the presser-foot, in the manner hereinbefore described. Upon its arrival, however, in the position shown by Fig. 2, the latch becomes closed by the loop which was previously placed on the needle-shank slipping over and off the latch-needle, leaving, however, the last portion of thread carried on such needle to form the succeeding loop, and so on indefinitely.

In this manner an embroidery-thread is enchained within itself like tambour-work, or, in other words, like the chain-stitch made by an ordinary single-thread sewing-machine, but without passing such thread into or through the cloth, merely laying it (after it has been enchained) in the form of a braid on the surface of the cloth, where it is sewed down by the ordinary action of the sewing-machine or other needle.

In place of the latch-needle herein described, and of the guide or loop *h*, I may use an ordinary eye-pointed needle, and in conjunction therewith a spring-holder for retaining the embroidery-thread, said spring-holder being so arranged that the vibrating needle will pass toward it on one side, and from it on the other, to form the succession of loops of the embroidery-thread.

I claim—

1. An embroidery-thread-enchaining device, constructed substantially as described, whereby said thread, without passing through the fabric, is enchained within itself, and laid in the form of a braid upon the surface of the fabric, for attachment thereto by sewing.

2. The embroidery-thread carrier consisting of the vibrating plate C, latch-needle E, and connecting mechanism, substantially as described, arranged as specified, for laying an embroidery-thread upon the surface of the fabric, as set forth.

3. The combination of the latch-needle E, the rock-shaft D, to which it is attached, and the vibrating plate C, on which the said rock-shaft has an independent axial motion, substantially as herein described.

4. The combination of the latch-needle E and the guide *h* on the presser-foot, substantially as and for the purpose herein specified.

5. The embroidery-thread carrier of an embroidery attachment to a sewing-machine, arranged and organized substantially as herein described, whereby it is enabled to perform a longitudinal and a lateral motion, as and for the purpose herein specified.

6. The combination of a sewing-machine needle with a vibrating embroidery-thread carrier, E, as set forth.

I. M. ROSE.

Witnesses:
HENRY T. BROWN,
FRED. HAYNES.